United States Patent
Thomas et al.

(10) Patent No.: US 6,421,300 B1
(45) Date of Patent: Jul. 16, 2002

(54) METHOD FOR SCREEN DISPLAY OF A MULTIDIMENSIONAL DATA FIELD, PARTICULARLY FOR DATA SUPPLIED BY A PASSIVE SONAR, AND SYSTEM FOR IMPLEMENTING SAID METHOD

(75) Inventors: Georges Thomas; Didier D B Bergero, both of Six Fours (FR)

(73) Assignee: Delegation Generale pour l'Armement, Armees (FR)

( * ) Notice: Subject to any disclaimer, the term of this patent is extended or adjusted under 35 U.S.C. 154(b) by 0 days.

(21) Appl. No.: 09/529,006
(22) PCT Filed: Oct. 6, 1998
(86) PCT No.: PCT/FR98/02124
§ 371 (c)(1), (2), (4) Date: May 25, 2000
(87) PCT Pub. No.: WO99/18451
PCT Pub. Date: Apr. 15, 1999

(30) Foreign Application Priority Data

Oct. 6, 1997 (JP) .................................................. 9-12430

(51) Int. Cl.⁷ .................................................. G01S 7/62
(52) U.S. Cl. .................................................. 367/135
(58) Field of Search .................................. 367/111, 135; 345/700, 502, 504, 505, 546, 520

(56) References Cited

U.S. PATENT DOCUMENTS

| | | | |
|---|---|---|---|
| 4,596,145 A | 6/1986 | Smith et al. | |
| 5,175,710 A | 12/1992 | Hutson | |
| 5,455,806 A | 10/1995 | Hutson | |
| 6,070,003 A | * 5/2000 | Gove et al. | 395/312 |

FOREIGN PATENT DOCUMENTS

DE  44 09 117 A  9/1995

* cited by examiner

Primary Examiner—Ian J. Lobo
(74) Attorney, Agent, or Firm—Oliff & Berridge, PLC

(57) ABSTRACT

A method for producing, from passive sonar data, operational images interactively controlled by an operator, continuously adjusted according to operational requirements and compatible with changing information requirements in real time. The invention uses a method for representing a multidimensional data field on a display screen which uses the screen co-ordinates for two dimensions of data and at least one of three color perception components among luminosity, hue and saturation for three other dimensions of the data, to produce bearing-time, azimuth-time, or frequency-time (circulating lofar) or frequency-bearing images with representation of frequencies by hue or interactive filtering.

13 Claims, 7 Drawing Sheets

METHOD FOR SCREEN DISPLAY OF A MULTIDIMENSIONAL DATA FIELD, PARTICULARLY FOR DATA SUPPLIED BY A PASSIVE SONAR, AND SYSTEM FOR IMPLEMENTING SAID METHOD

BACKGROUND OF THE INVENTION

1. Field of Invention

The present invention relates to interactive processing and presentation of multidimensional data, for example in passive sonar, radar imaging, geophysics, medicine, remote detection, etc.

2. Description of Related Art

The data furnished by a passive sonar is inscribed in a five-dimensional hyper-volume: time, distance, azimuth, frequency, and signal-to-noise ratio.

It is known to present the data to the operator in the form of fixed classical-format images displaying only three volume dimensions per image:

azimuth-time format presenting azimuth scrolling of noise-makers detected by spatial and frequency processing sequences conducted in the "upstream" part of the sonar receiver, with the signal-to-noise ratio being coded by lightness. The operator has no spatial information;

"lofagram" or "lofar" format that, in a horizon sector corresponding to a channel formed by spatial processing, presents the frequency information as a function of time with the signal-to-noise ratio being coded by lightness. The operator has no scrolling information to cover the 360° of azimuth, or juxtaposes the same number of elementary "lofar" images as there are channels, requiring a large screen surface with the use of at least two screens, entailing considerable operating difficulties;

"azimuth-frequency snapshot" format that presents the frequency information as a function of the azimuth for the present instant or after a fixed temporal integration, with the signal-to-noise ratio being coded by lightness. The operator has no time information.

Complete presentation of the information delivered by sonar thus requires juxtaposition of corresponding elementary three-dimensional images (x, y, and lightness) of cross sections in the data volume, requiring huge display surface areas. The correlation between the various images is not interactive, which is incompatible with the operation need for real-time processing of the sonar data.

Moreover, the sonar images are composed of raw video signals and superimposed synthetic objects (tracks) leading to substantial information flows that have to be controlled in order not to swamp the operator.

SUMMARY OF THE INVENTION

The goal of the invention is to improve the performance of current or future passive sonar by interactive data processing, compatible with the real time of the sonar process, and meeting the following needs which are not met by known methods used to date:

ability of the operator to take in all the information supplied by the "upstream" processing sequences, i.e. with a panoramic, multidimensional view, without having to bring up several rigidly predefined images in succession and waiting for them to settle, dynamic, flexible, and fast correlation between the various pieces of information contained in the cross sections interactively selected in the data "volume,"

creation of interactive filters in the time, frequency, and azimuth dimensions, these filters enabling the information presented to the operator to be confined to the information of interest, without interaction with the "upstream" processing sequences, affording a visual "processing gain" that improves the efficiency of the Man-Machine system, compatibility and complementarily between the presentation of so-called synthetic data supplied by the sonar information-processing algorithms and the presentation of the "raw" data, improved by the invention.

The invention also sets out to create methods calling only on now-classical image-processing and image-manipulation means that are independent of spatial and spectral processing of signals from sonar hydrophonic sensors and that adapt to the parameters of these types of processing such as the number of channels formed, the number of spectral analysis channels, the degree to which this "upstream" processing delivers "raw" information in the form of time, bearing (or azimuth), frequency, and signal-to-noise ratio quadruplets without preliminary formatting.

The screen surface area involved by using the invention is smaller than that required for classical methods.

Another goal of the invention is to achieve the advantage of completely uncoupling data systems dedicated to "upstream" processing of the sonar receiver, from the graphic data system that carries out processing treatments and supports the Man-Machine interfaces, and to reduce the information flows between these systems: links are only through raw "quadruplet" packages and not in formatted images with the redundancies the latter implies.

The invention thus relates to a method for representing a multidimensional data field on a display screen, consisting of using the screen coordinates for two data dimensions and at least two color perception components out of the three components: lightness, hue, and saturation, for at least two other dimensions of said data.

According to other features of the invention:

the method consists of organizing the multidimensional data fields into a volume memory broken down into virtual image planes;

the method consists, in each virtual image plane, of coding specific data sample parameters by graphic parameters, two parameters being related to the memory coordinates and one parameter being coded by pixel dynamics in grey levels;

the method also consists of filtering specific parameters;

the filtering operations are carried out by interactive modifications of transfer tables acting on the grey levels stored in the virtual images;

the filtering operations are conducted by logical and/or mathematical operations between virtual images.

The invention also relates to a method of the type defined above applied to creation of a real image presented on a display screen from results stored im virtual images, characterized in that it consists of ensuring an interactive modification of a final transfer table that calculates the values of the red, green, and blue components of the pixels as a function of the desired lightness, hue, and saturation values.

The invention also relates to a method of creation, from passive sonar data, of operational images controlled interactively by the operator continuously according to operating needs and compatible with the real-time information requirements, characterized by implementing the representation method of the type defined above to create a bearing-time or azimuth-time image, representing frequencies by the hue, and interactive filtering.

According to other features:

interactive filtering involve creation of a hue filter by imaging;

interactive filtering also involves creation of a circulating lofar image interactively adjustable in terms of direction and of bearing range;

interactive filtering also involves creation of an interactively adjustable bearing-time spectral image in the area of interest;

interactive filtering also involves creation of a spectral image in the frequency-bearing format with interactively adjustable history.

BRIEF DESCRIPTION OF THE DRAWINGS

The invention will best be understood by reading the description below with reference to the attached drawings, provided solely as examples, in which.

DETAILED DESCRIPTION OF PREFERRED EMBODIMENTS

Figure 1:
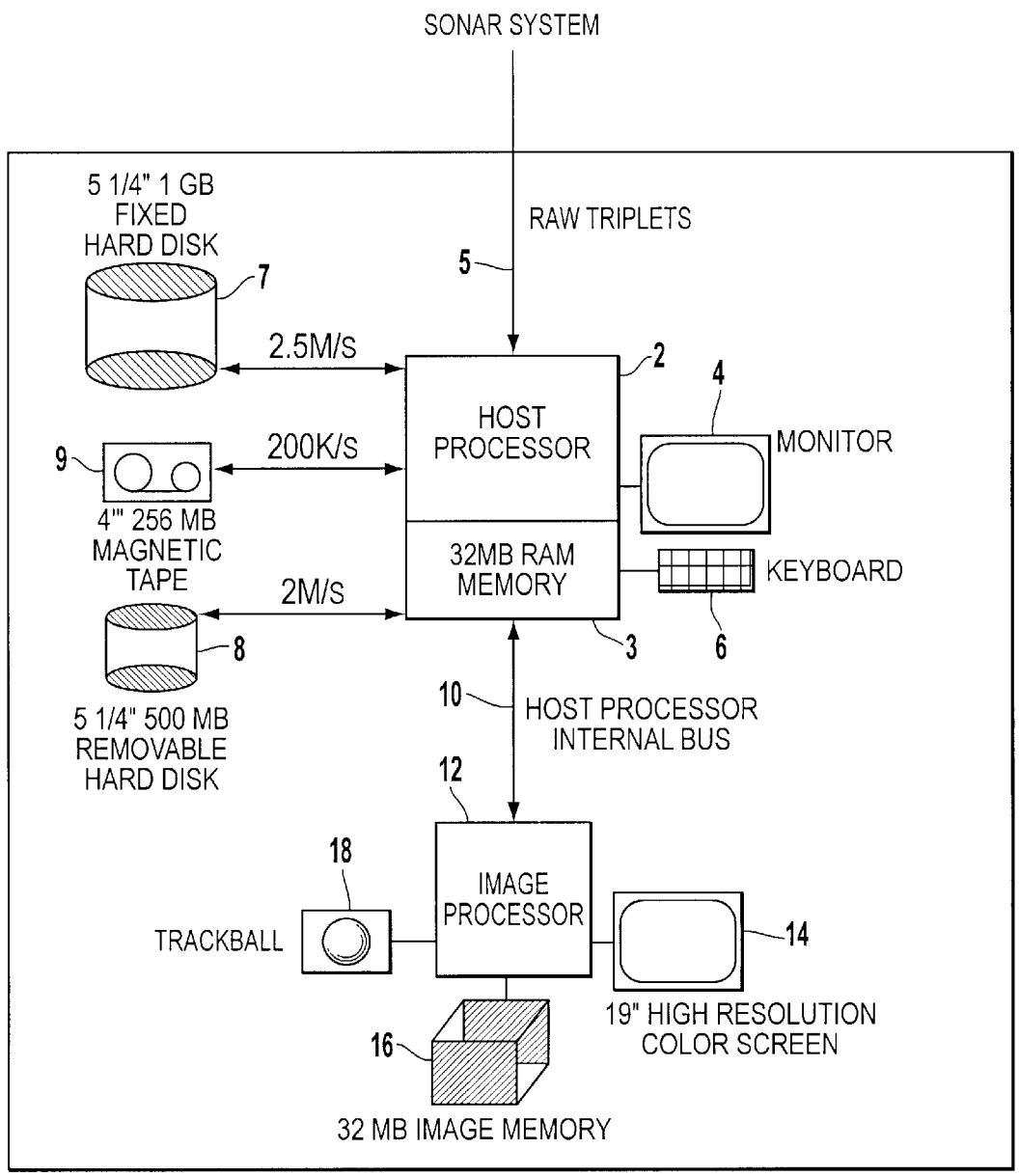
FIG. 1 is a block diagram of the interactive sonar data processing system according to the invention.

The general means of the invention will first be described. These means can be divided into standard means and specific means. The standard means comprise a classical workstation under UNIX or Windows NT and basic image-generating software. The specific means comprise image processing maps with memory and pixel processors as well as original application programs for processing and manipulating data and images.

One embodiment of the invention will now be described in detail. The multidimensional data interactive processing and display system shown in FIG. 1 comprises a workstation equipped with image processing maps.

According to the present example, the workstation is a Digital station under XWINDOWS/MOTIF. It has a host processor 2 with a 32 MB RAM memory 3 and a monitor 4. Host processor 2 is connected by a line 5 to a sonar system (not shown) from which it receives raw triplet data as defined above.

The following are also associated with host processor 2: a keyboard 6, a fixed 5-¼-inch hard disk 7 with a capacity of 1 GB, designed to store the system software including the processing software and the specific software, and for durable storage of sonar data such as the raw triplets or surveillance images such as lofars, IFA, and surveillance (θ(t)), a removable 5-¼-inch hard disk 8 with a capacity of 500 megabytes for storing sonar data such as raw triplets or surveillance images such as lofars, IFA, and surveillance (θ(t)) temporarily so that they can be processed on land or at another site able to accept the removable hard disk.

The system also has a 4-inch magnetic cartridge reader 9 with a capacity of 256 megabytes to provide data security for the system by backing up one of the hard disks 7 and 8 and to store or re-read data on a storage medium that is as universal as possible.

Host processor 2 is connected by an internal bus 10 to an image processor 12 with which there are associated a high-resolution color display 14, a 32-MB image memory 16, and a control device comprised of a track ball 18.

Figure 2:
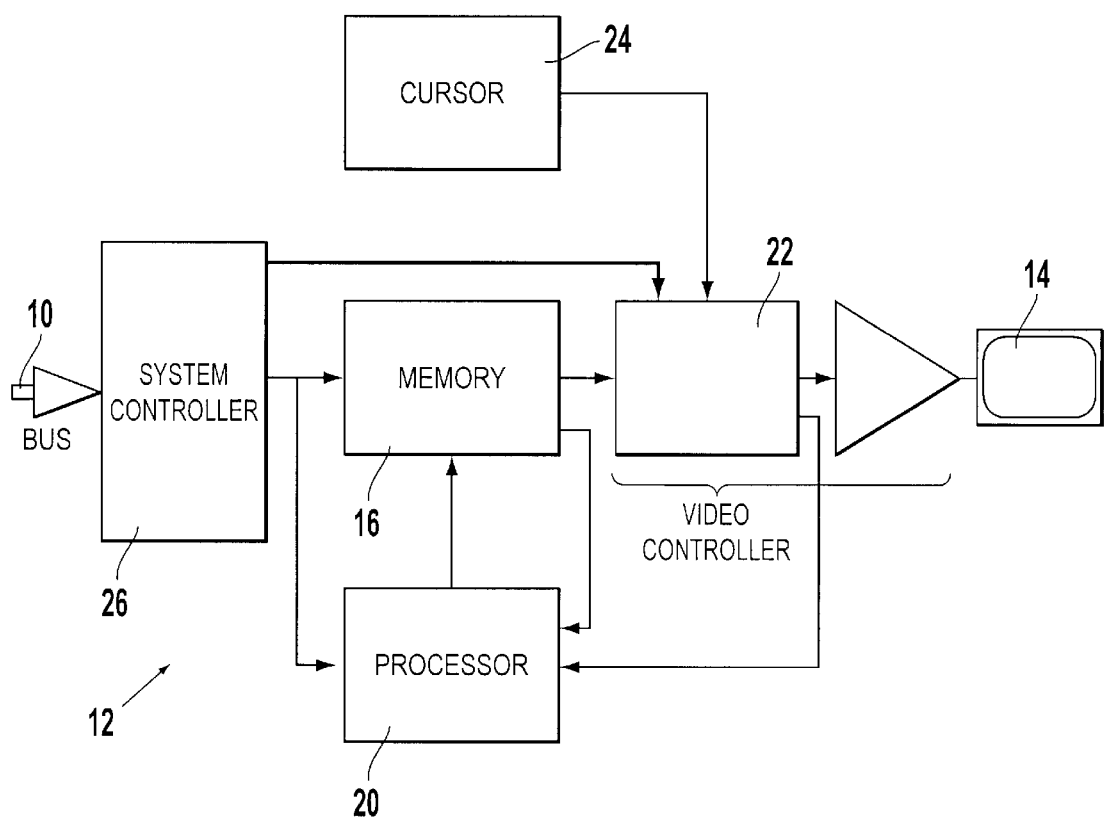
FIG. 2 is a block diagram of the graphic processor forming part of the system in FIG. 1.

The image processor or graphic processor shown schematically in FIG. 2 is a Gould IP9527 processor in the present example. A large, high-performance image memory 16 is associated with this processor, giving the operator instant access to many latent images. Processor 20 itself is a fast pixel processor for executing logical and arithmetic operations between images at high speed and executing classical image-processing algorithms such as convolutions, histograms, etc. The following are also provided: an image workstation including color monitor 14 (FIG. 1), a video output controller 22 able to operate color monitor 14 from three red, green, and blue composite signals, a cursor generator 24 with which track ball 18 (FIG. 1) and a character generator are associated to produce annotations superimposed on an image or to one side or the other of an image (not shown), a program in host processor 2 which is modular over several levels from register programming to interactive operation of the system under the host operating system.

Figure 3:
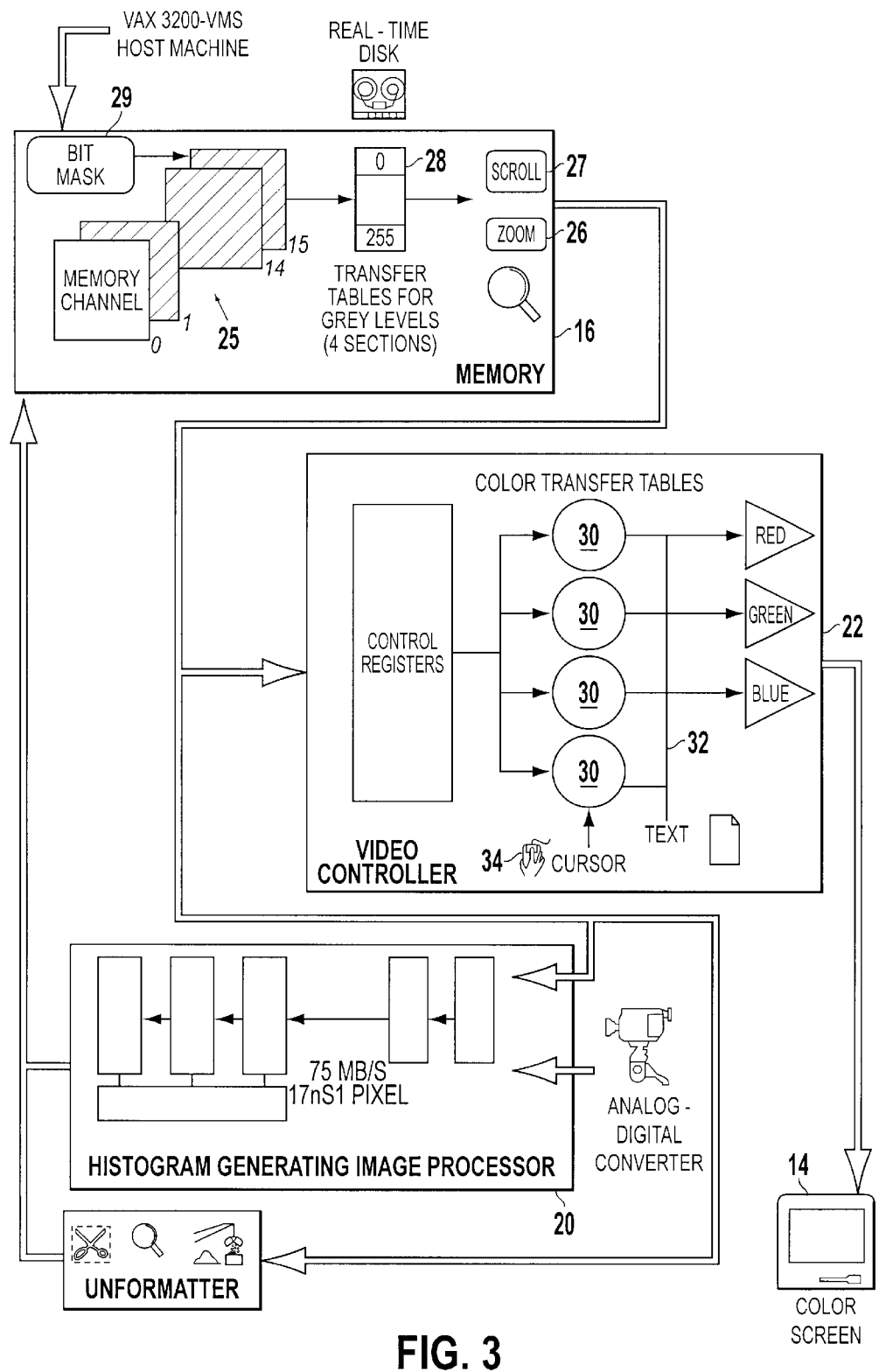
FIG. 3 is a more detailed diagram of the graphic processor of FIG. 2.

An interface controller 26 is connected by bus 10 to host processor 2. Reference will now be made to FIG. 3 to describe in greater detail the image processor shown schematically in FIG. 2. Image memory 16 of the image processor is constructed as follows. The images displayed and processed by the system are contained in eight 4 MB random access memory channels with 2K*2K*8 bits where the byte represents the gray level of the pixel from 0 (black) to 255 (white) and where each pixel is accessible by its X and Y coordinates, in a orthogonal system of coordinates with axis 2048. Each memory channel such as channel 25 shown in FIG. 3 can serve to store images or graphic information in overlay mode with 256 gray levels and 4096 different colors.

The zoom, scroll, transfer, masking, and addressing functions, some of which are shown in FIG. 3, can be performed on the stored images. Zoom function 26 associated with each memory channel 25 is effected simply by duplicating pixels (1:2) to (1:16) at X. Scroll function 27 enables the image to be scrolled on the corresponding memory channel 25 with or without feedback or wraparound on the channel. Transfer function 28 is composed of tables with 256 inputs and 256 outputs, one input per output, where a pixel can change gray level with 256 or $2^8$ possibilities. The tables are supplied in four sections of 256 bytes each. Masking function 29 relates to the depth of the pixel following read/write orders received from host processor 2 (FIG. 1).

The eight memory channels of 2048*2048*8 bits can be configured in any logical combination and can be uncoupled by the software into parallelogram-shaped areas of interest (especially for creating histograms). The images are accessible by a multi-bus access, by the video controller 22 (FIG. 2), by the pixel processor 20, and by the system controller 26 for reading and writing pixels by host processor 2.

Pixel processor 20 is a rapid "pipeline" processor that at its input processes a combination of memory channels 25 with the output of video controller 22 to carry out operations such as multiplication, addition, subtraction, and comparison.

The output of processor 20 is sent to selected memory channels 25. Processor 20 is capable of carrying out 16-bit operations to facilitate standard image-processing algorithms such as convolution, correlation and contour detection. Flexible control enables separate operations to be performed on different regions of an image.

The video controller output can be sent to the processor; thus the final output image can contain the raw data, overlaps, alphanumeric characters, and cursors and thus be sent to a memory channel. The computing power of this processor is approximately 40 M operations per second.

The basic operations are the following:
sum of 4 products on 8 bits (ax+by+cz+dw) where x, y, z, w, a, b, c, d are images, constants, or functions in one pass,
multiplication on 16 bits without sign in one pass,
multiplication on 16 bits with complement on 2 in 3 passes,
addition and subtraction on 8, 16, and 32 bits,
maximum MAX and minimum MIN of two images pixel by pixel in regions 8 or 16 bits deep,
selection of regions of interest where operations are to be conducted (parallelogram-shaped regions),
output shift by bit rotation, on a 32-bit number, on one out of two 16-bit numbers, and on one out of four 8-bit numbers.

The more elaborate operations are the following:
linear filtering in two dimensions in one pass,
nonlinear filtering in two dimensions in one pass,
production of local statistics (mean in one pass and variance in one more pass),
image weighting for creating image dissolves in one pass.

The histogram generator of processor 20 is a counter for counting the occurrences of gray levels of pixels in one image region. It creates a table containing the distribution frequencies of gray levels in the image; the frequency relates to the number of pixels processed (1048576 in the 1K*1K case).

The performance is the following:
results on 24 bits in 4 passes,
input gray levels on 8 or 12 bits,
controlling the region of interest (parallelogram-shaped region).

It will be noted that one pass corresponds to processing a standard 512*512 pixel video image in ⅟25 of a second, i.e. processing 6.26 M pixels/s. Video controller 22 selects, modifies, and draws on displayable data and makes the digital/analog conversion of data into video signals for monitor 14.

The system also includes:
a transfer function 30 for LUT coloring,
a mixer 32 for taking into account overlap information such as that of a cursor, of alphanumeric characters, and graphic information superimposed on the image,
a character generator. The character fonts are free within the constrains of ergonomic concerns but must be programmable by host processor 2 (FIG. 1). The system has two programmable cursors 34, to be chosen from a set of standard cursors and from a set of cursors designed entirely by the user.

The cursor generator receives an external command from a peripheral device such as a track ball or joystick to change the position (x, y) of the cursor and give out cursor control instructions (for example: locking one of the two cursors when a parallelogram is created),
multi-windowing from several memory channels. This multi-windowing is rigid, according to a combination of quadrants of space (1024*1024). Height memory channels can appear on the display on eight windows of variable shapes controlled by software,
a peripheral device manager. The system comprises an external peripheral device for interactive control in the form of a track ball, for example, to move cursors in the direction in which the track ball moves by a value proportional to the movement of the track ball.

The track ball also contains six push buttons whose combination of binary logic states can be viewed and which can send interruptions [sic] to the cursor generator, an analog-digital converter, and classical monitor circuits. The software used employs a library in C, PASCAL, or FORTRAN. Multiprogramming is done from host processor 2 (FIG. 1). The system can support four processes launched in parallel that share the following independent internal resources:
pixel processor,
video controller,
text generator,
cursor generator,
peripheral device (track ball),
each memory channel.

Each gray level transfers a table of each memory channel (one process can generate channel 1 and another can generate the ITT of channel 1). In fact, the physical system can at any moment in time be divided into four logical systems composed of a combination of the above resources. The physical interface, at a low logic level, is compatible with the internal bus of the workstation.

At a high level, near the application, the instructions sent to the system can be divided into three categories:
the write instructions where the host processor follows the writing in the system registers,
the read instructions where the host processor follows the reading in the system registers,
the automatic instructions where the host processor leaves the system to operate alone.

The system just described with reference to FIGS. 1 to 3 enables the following functions to be carried out.

"Bearing or Azimuth-time" Format Images with Overall Spectral Information

An image in the "bearing or azimuth-time" format with overall spectral information supplies raw data to the operator, incorporating first-level spectral information which enables the following to be done by interactive manipulation:
increase the contrast in certain frequency bands to better distinguish weak noisemakers that may not be detected by "noisemaker" tracking,
detect changes classifying the acoustic situation of noisemakers, whether tracked or not,
orient the operator to the frequency bands that appear to contain pertinent information.

The images can be described as follows:
abscissas: bearing (or azimuth): practical resolution approximately 0.2 degree (1024 pixels for 180 degrees),
ordinates: time,
lightness: proportional to the signal-to-noise ratio expressed on eight bits,
hues: four hues each corresponding to one-quarter of the spectral data amount: one hue per ¼ octave or one hue per octave,
interactive manipulations: selective, continuous variation in lightness (can go to the point of complete extinction) by a mouse (or track ball) for each of the four-hue combinations; this manipulation is guided by a color bar with the frequency limits in Hz.

Amplitude-frequency Representation of "Areas of Interest" on Bearing or Azimuth-time The format for amplitude-frequency representation of "areas of interest" on bearing- (or azimuth-)time will be described below. This format is an "appendix graph": to be juxtaposed with the image described in the previous paragraph.

It enables the operator to obtain instantly an overall view of the amplitude-frequency dimensions of the spectral content of the bearing-time area in which he is interested.

This format is obtained by interactive determination. Using the track ball, the operator chooses a parallelepiped "area of interest" roughly coinciding with the area to be scanned spectrally on the bearing-time image. The system calculates the histogram and views it as an "appendix graph":
on the abscissas: frequencies,
on the ordinates: number of occurrences of each frequency, in the area of interest,
lightness: constant to be set once and for all,
hue: green.

Bearing Filters or "Circulating Lofar"

The bearing filter or "circulating lofar" format is a dynamic version of a classical frequency-time format that is interactively and instantaneously juxtaposable, unlike lofars with channels reserved for classification and unlike the panoramic surveillance image used in the paragraph on "bearing- or azimuth-time" format images. It enables the operator to obtain instantly an overall view with frequency-time dimensions of the spectral content of the bearing zone of interest.

The width of the zone can be reduced to the resolution of the bearing-time image, thus enabling the operator to discriminate between the signatures of two neighboring noisemakers.

The interactive determination is made as follows:
the operator varies the borders of the bearing range of interest using the track ball,
a right-left movement determines the position of the zone,
a front-back movement determines the width of the zone,
these borders show as two thin vertical lines covering the entire height of the image displayed.

The system displays the lofar corresponding to the zone thus determined dynamically, i.e. continuously and instantaneously:
abscissas: frequencies of all the input data,
ordinates: time,
lightness proportional to the S/N ratio,
hue: monochromatic, preferably green.

The "circulating lofar" is juxtaposed with the bearing- (azimuth-) time image, with parallel "time" axes to permit time-wise correlation of the two images.

Spectral Filters or "Threat Filters"

Spectral filters or "threat filters" are obtained by applying spectral filtering to the bearing-time image in a template established interactively by the operator; the operator composes his filter or filters continuously or discretely, within the limits of combinations permitted by the quantification of the frequencies.

This filtering can very quickly reveal the presence of any noisemaker whose acoustic radiation matches the template of the filter and of changes in the acoustic situation of noisemakers already detected, or enable noisemakers not discerned by other methods to be detected.

Continuous interactive construction of the filter is provided by the track ball:
a right-left movement determines the position of the template,
a front-back movement determines the width of the template.

The discrete interactive design of the filter is brought about using the keyboard or any other input device.

The operator enters the values of discrete frequencies accompanied by an appropriate df, which are deemed to characterize the threat. The system instantaneously recomposes the bearing-time image by displaying only quadruplets whose frequency is within the template. Alternatively, these quadruplets are displayed with a hue contrasting with that of the remainder of the image which in this case must be monochromatic (green).

Frequency-bearing or -azimuth Image with History (FBH or FAH)

An image in the frequency-bearing (or -azimuth) format with history (FBH or FAH) is a development of the frequency-azimuth snapshot (FAS). It provides the operator with an overall spectral view over the entire horizon and over a temporal extent that is interactively adjustable in terms of date and duration. This extent may or may not contain the last recurrence, i.e. the frequency-azimuth snapshot. This image provides the bearing (azimuth) on the abscissa, with the same scales as those of the bearing- or azimuth-time format. It gives:
on the abscissas, the bearing or azimuth, with the same scales as those of the "bearing- or azimuth-time" format described above,
on the ordinates, the frequencies over the entire band processed.

Interactive manipulations enable the operator to adjust the extent of the temporal range displayed using the track ball, as follows:
a right-left movement gives the date of the range,
a front-back movement gives the duration of the range.

The last recurrence is displayed with a particular graphic.

Graphic Features Common to the Various Images

The interactive graphic features present as standard features in modern display equipment, such as "panoramic" and "zoom", are used whenever useful for image processing:
centering the images on the azimuth or bearing in which the operator is interested; this also prevents images from being constructed with overlapping scales and thus saves space,
positioning the image displayed in a large stored-image area ("virtual image"); this feature is useful in the following operational cases:
re-display of a prior temporal zone, provided the corresponding raw quadruplets were saved in the image memory,
rapid scanning of a large quantity of information,
focusing (with or without enlargement) of the image on an interactively selected sector: obtaining "sectoral" images.

The method implemented on the computer system described with reference to FIGS. 1 to 3 is based on gray-level coding of parameters other than signal amplitudes. We thus have sonar images, invisible to the operator, where the frequency, bearing, and time are coded in gray levels.

The use of color is implemented as follows.

On a screen, an image is characterized by graphic parameters: X coordinate, Y coordinate, and "COLOR."

The problem consists of consistently associating the physical parameters, characteristic of the data to be represented, with the graphic parameters. The color breaks down into three largely independent magnitudes:
lightness,
hue,
saturation.

As saturation is difficult to use, it is set at 1 and the first two parameters are used. For illustration, construction of a surveillance image will be taken as an example. A classical surveillance image consists of representing S/N ratios, noted AMP, associated with a frequency range F, as a function of time T and azimuth θ. The following associations may be used:

| PHYSICAL PARAMETERS | GRAPHIC PARAMETERS |
|---|---|
| T | Y |
| θ | X |
| AMP | LIGHTNESS |
| F | HUE |

To combine LIGHTNESS and HUE consistently, one begins from two intermediate images obtained from physical measurements: image A which gives AMP as a function of T and θ, AMP being the highest value found for a given T and a given θ,

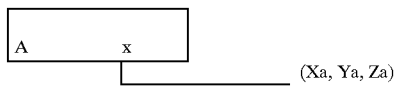
(Xa, Ya, Za)

and image F which gives F as a function of T and θ, F being the value associated with the highest value of AMP found for a given T and a given θ.

We take zf for the basic gray level of the range given by a color table or lookup table (LUT) constituting the color, associated with the frequency range (the smallest color level in a LUT strip is called "basic gray level").

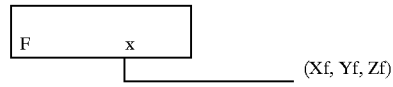
(Xf, Yf, Zf)

The image R should be found

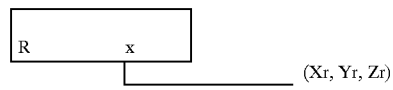
(Xr, Yr, Zr)

We have:

Xa=Xf=Xr

Ya=Yf=Tf

Zr=f(Za, Zf).

We attempt to determine f(u,v) so that its perception is equal to R. For this purpose, we bring in a graphic processor resource: the color tables associated with the red, green, and blue "canons" (the LUT tables or "color tables"). We place in one table for example four color strips (blue, green, yellow, and red). The four hues implemented are used in practice to detect four frequency ranges.

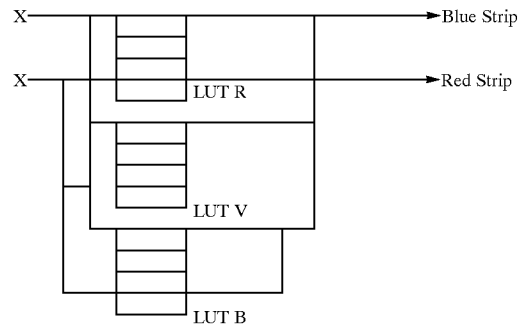

Thus, to obtain image R, one need only move in the color strip associated with the frequency range, proportionally to AMP. In general, AMP is coded on 256 gray levels. Hence the range of variation of Za must be restricted to 256/4. This is because the greater the number of colors, the less the dynamics of Za.

Finally we obtain:

Xa=Xf=Xr

Ya=Yf=Yr

Zr=Zf+255 Za number of hues

To obtain R we thus combine images A and F linearly. Once the surveillance image is formed, an operator can examine it by manipulating the gray levels associated with a frequency range. This has the effect of varying the lightness of the associated color according to linear or exponential logarithmic laws.

Thus, surveillance images can be obtained such that images in the "bearing-time" format with overall spectral information are obtained. Implementation of the invention also calls on the use of logical operators. The first solution has the defect of not enabling the maximum dynamics of the gray levels, 256 in number, to be used.

The solution that will now be described remedies this problem. There are still images A and F, but both now serve to code 256 amplitudes and 256 ranges of frequencies, respectively, in gray levels. It is then easy to create an image Fi where all the pixels are zero except those due to a certain frequency range whose gray level is 255. For this, one need only inject a masking function with a crenellated shape into the associated LUT color table.

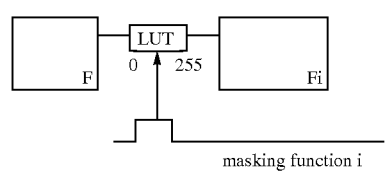

masking function i

We then obtain a local "AND" between the A and Fi images to obtain an image Ri: surveillance image given by frequency range i.

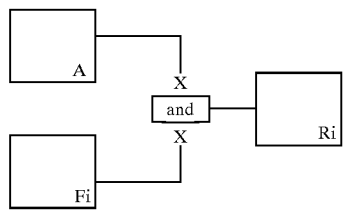

This method is very useful because the operator can interactively change the LUT table to obtain 256 Ri images while only two images A and Fi are stored in memory. The images obtained can be scanned interactively by changing the gray level.

Figure 4:
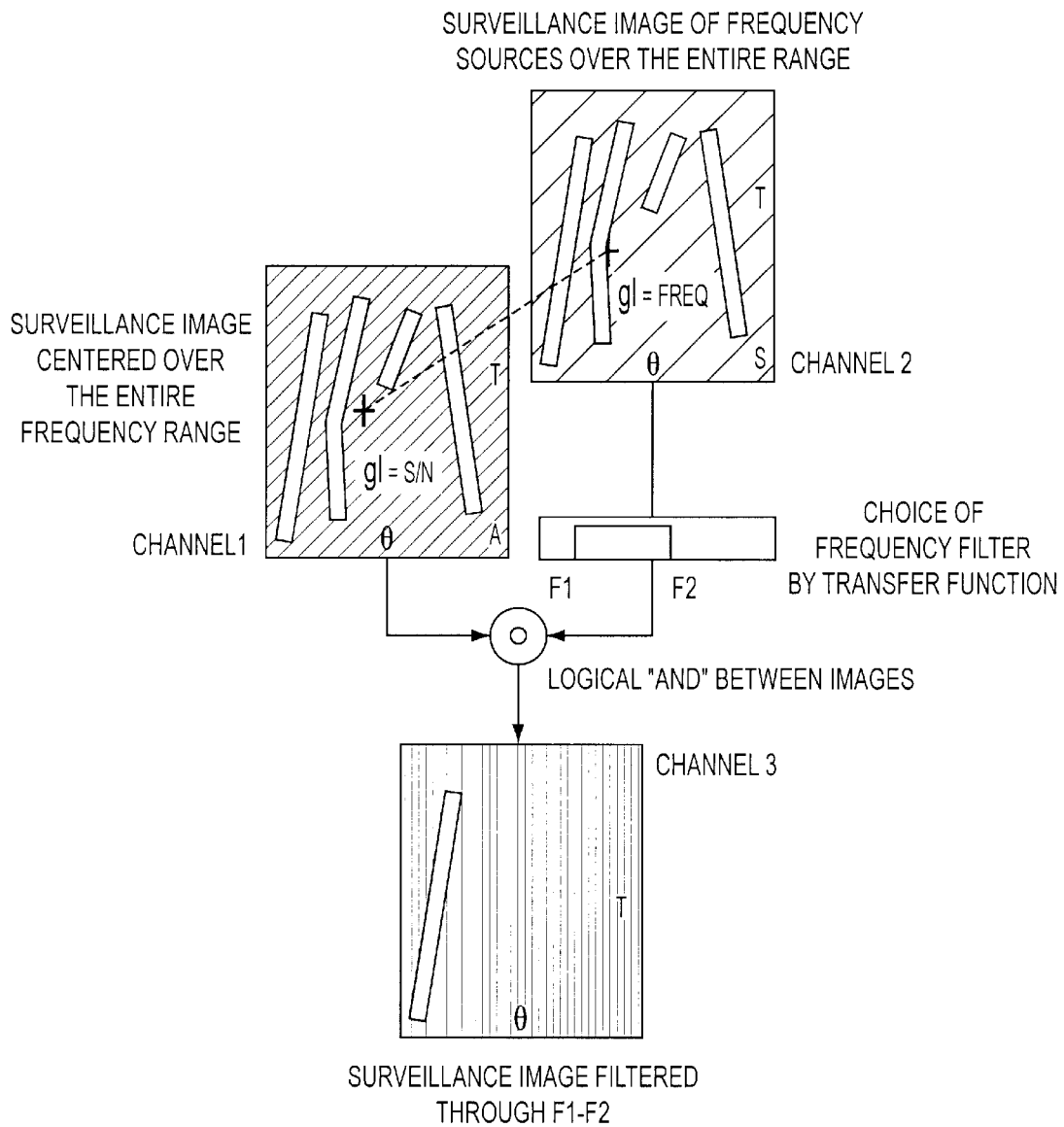
FIG. 4 is a representation of spectral filters or "threat filters" created by the method of the invention.

FIG. 4 illustrates the process by which spectral filters or threat filters are implemented. First, a surveillance image is created, centered over the entire frequency range that appears in a memory channel 1, and whose gray level gl determines the signal-to-noise ratio: gl=S/N. The corresponding image appears on the monitor screen in the form of an image A. A surveillance image S of the frequency sources over the entire range is then formed in a memory channel 2. The gray level gl of this image indicates the frequency gl=freq. Image S appears in a second area of the screen. A transfer function frequency filter is chosen between frequencies F1 and F2 and a logical AND operation is applied between the two images taking into account the filtering at the selected frequency, and a surveillance image filtered through F1–F2 is obtained in a memory channel 3.

Figure 5:
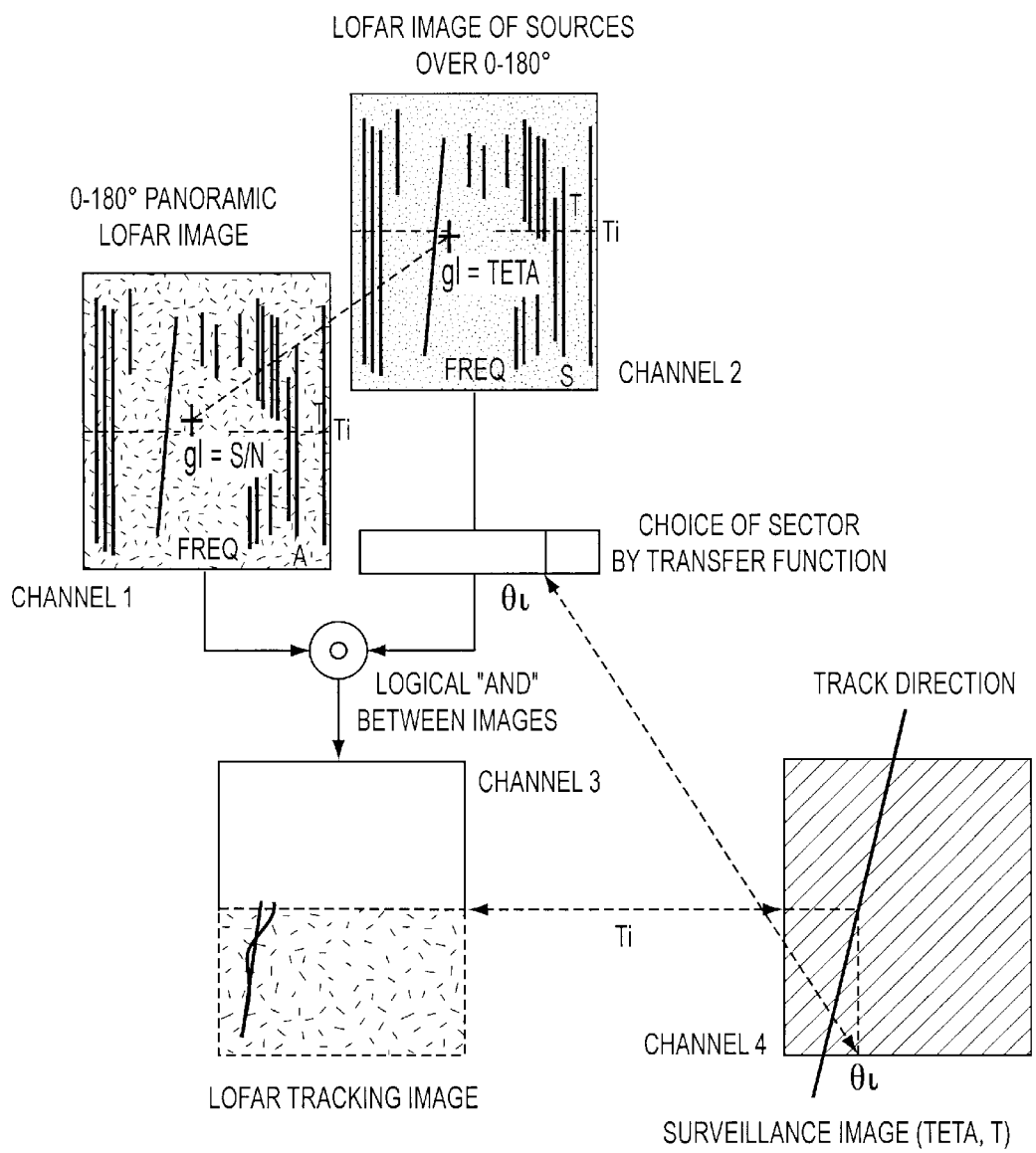
FIG. 5 is a representation of a bearing filter or "circulating lofar"

Creation of the bearing filter or "circulating lofar" is shown in FIG. 5. This is the first dual aspect of the previous application. Here, images are manipulated in the lofar format (F,T) with a source image where the origin bearing of the maximum S/N ratio at a given point in time is coded. A 0–180° panoramic lofar image is formed in a memory channel 1. This image A appears in a first area of the monitor screen. The gray level gives the S/N ratio:

$$gl=S/N$$

A 0–180° source lofar image is formed in a memory channel 2. This image S appears in a second area of the screen.

The gray level indicates the TETA value:

$$gl=TETA$$

Figure 6:
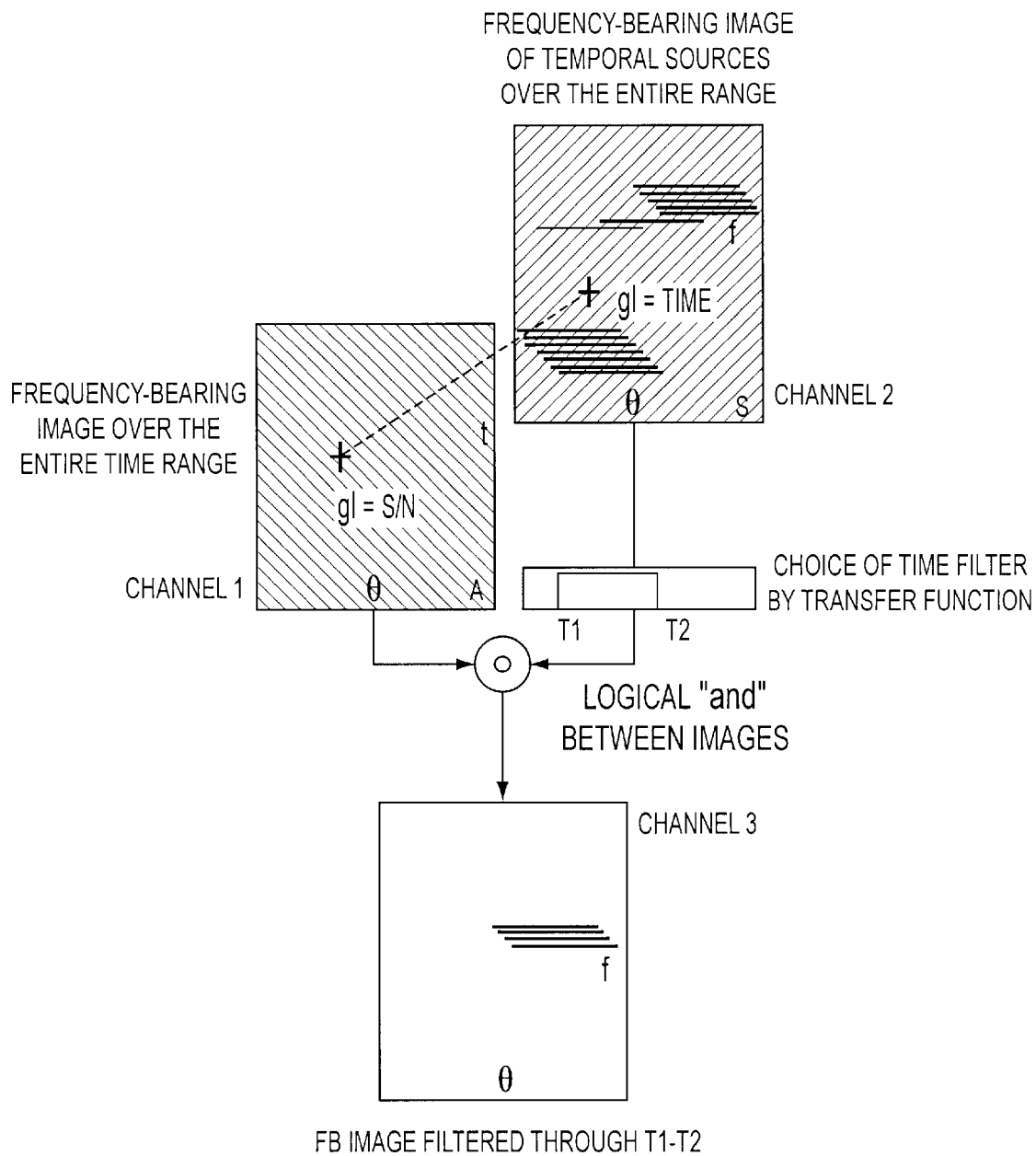
FIG. 6 is a representation of a frequency-bearing format image with history.

The operator then chooses a transfer function sector according to the surveillance image (TETA,T) created in a memory channel 4. An AND logical operation between images brings about the appearance, in a third area of the screen, of the tracking lofar image created in a memory channel 3. Creation of an image in the frequency-bearing format with history (FBH) is shown in FIG. 6. This is the second dual aspect of the first application.

Here, images are manipulated in the lofar format (F,θ) with a source image where the "origin time" of the maximum S/N at a given point in time is coded. A frequency-bearing image A over the entire time range is created in a memory channel 1. This image appears in a first area of the screen; the gray level gl gives the S/N ratio: gl=S/N A frequency-bearing image S of temporal sources over the entire range is created in memory channel 2. This image appears in a second area of the screen, with the gray levels indicating the time gl=time.

The operator chooses a transfer function time filter in an application interval T1, T2 and a logical AND operation between images enables the frequency-bearing image filtered through time interval T1–T2 and appearing in a third area of the screen to be created in a memory channel 3.

Figure 7:
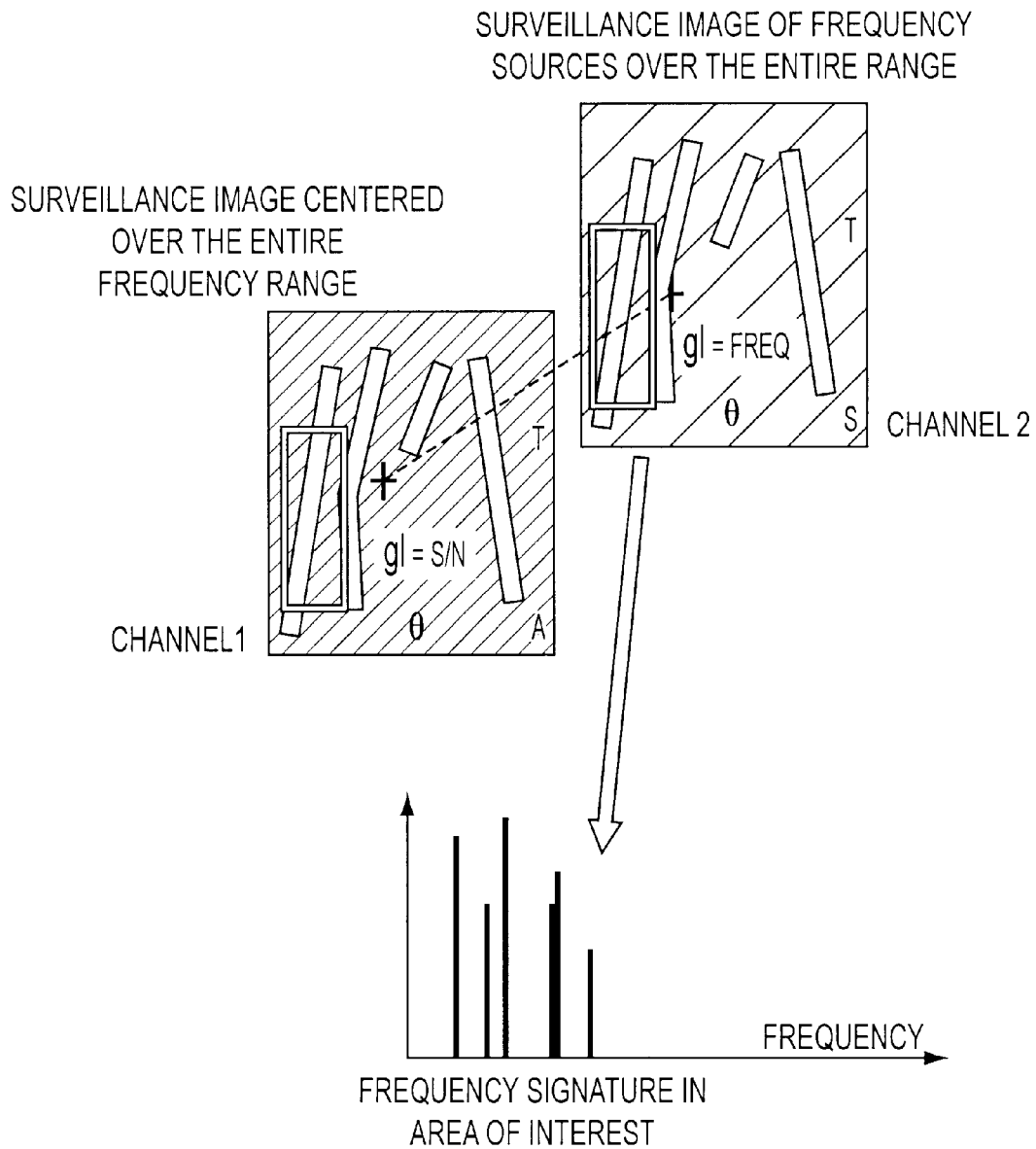
FIG. 7 is an amplitude-frequency representation of the "bearing-time area of interest."

FIG. 7 shows the creation of an amplitude-frequency representation of the "bearing-time area of interest." Images A and S are the same as those created for the spectral filters or "threat filters" in FIG. 4. In images A and S, an area of interest is delimited by a rectangle and a histogram is established on the source image in the area of interest.

This histogram indicates the signatures of the sources in the area of interest. In the embodiment just described, the computer equipment referred to is indicative only. Other computer systems with equivalent features and performance could be used.

What is claimed is:

1. A method of representing a multidimensional data field on a display screen comprising:

organizing a plurality of multidimensional data fields into a volume memory broken down into at least one virtual image plane;

using a plurality of screen coordinates for two data dimensions and at least two color perception components out of the following three components: lightness, hue, and saturation, for at least two other dimensions of the data;

coding, in each virtual image plane, specific data sample parameters by graphic parameters, two parameters being related to the screen coordinates and one parameter being coded by pixel dynamics in a gray level; and then carrying out graphic filtering operations of the specific data sample parameters, these filtering operations being conducted by logical and/or mathematical operations, between virtual images by means of interactive changes in transfer tables acting on the gray levels stored in the virtual images.

2. The method of claim 1, further comprising interactively presenting in juxtaposition an azimuth-time image with a plurality of frequencies being represented by hue and a frequency-time image (circulating lofar) presenting the spectral content of an area of interest is interactively adjustable in the azimuth-time image.

3. The method of claim 1, further comprising interactively presenting in juxtaposition an azimuth-time image with a plurality of frequencies being represented by hue and a frequency-azimuth format image with interactively adjustable history.

4. The method of claim 2, wherein the filtering operations are conducted by logical and/or mathematical operations between virtual images.

5. The method according to claim 1, applied to creation of a real image presented on a display screen from results stored in virtual images, further comprising: ensuring an interactive modification of a final transfer table that calculates the values of the red, green, and blue components of the pixels as a function of the desired lightness, hue, and saturation values.

6. The method of claim 1, further comprising creating, from passive sonar data, operational images controlled interactively by an operator continuously according to operating needs and compatible with real-time information requirements to create a bearing-time or azimuth-time image, representing frequencies by hue, and interactive filtering.

7. The method according to claim 6, wherein the interactive filtering involves creation of a hue filter by imaging.

8. The method according to claim 6, wherein the interactive filtering also involves creation of a circulating lofar image interactively adjustable in terms of direction and of bearing.

9. The method according to claim 6, wherein the interactive filtering also involves creation of an interactively adjustable bearing-time spectral image on the area of interest.

10. The method according to claim 6, wherein the interactive filtering also involves creation of an image in the frequency-bearing format with interactively adjustable history.

11. A system for representing a multidimensional data field on a display screen, comprising:

- a host processor designed to be connected to a multidimensional data acquisition system means for storing the system software and operating software and for preserving the multidimensional data;
- an image processor connected to host processor by an internal bus;
- a high resolution color screen;
- an image memory; and
- a control device actuatable by an operator, wherein the image memory has random access memory channels in which each pixel is accessible by X and Y coordinates in an orthogonal system of coordinates, each memory channel serving to store images or graphic information overlapping over a predetermined number of gray levels and different colors.

12. The system of representation according to claim 11, wherein the memory channels can be configured in any logical combination and uncoupled by the system software into parallelogram-shaped areas of interest in particular for producing histograms.

13. The system of representation according to claim 11 further comprising, a video controller able to control color monitor by three composite green, blue, and red signals,

- a cursor generator with which are associated the control device actuatable by an operator; and
- a character generator to produce annotations associated with an image wherein the software contained in host processor is a modular program over several levels going from register programming to interactive system operation.

* * * * *